(12) United States Patent
Zilist et al.

(10) Patent No.: US 7,831,732 B1
(45) Date of Patent: Nov. 9, 2010

(54) NETWORK CONNECTION UTILITY

(75) Inventors: Ira Zilist, Chicago, IL (US); Daniel Reimann, Mt. Prospect, IL (US); Devin Henkel, Chicago, IL (US); Gurpreet Singh, Clarendon Hills, IL (US)

(73) Assignee: Federal Reserve Bank of Chicago, Chicago, IL (US)

( * ) Notice: Subject to any disclaimer, the term of this patent is extended or adjusted under 35 U.S.C. 154(b) by 1196 days.

(21) Appl. No.: 11/192,991

(22) Filed: Jul. 29, 2005

(51) Int. Cl.
*G06F 15/16* (2006.01)

(52) U.S. Cl. .................. 709/237; 709/217; 709/219

(58) Field of Classification Search .......... 709/217, 709/219, 237
See application file for complete search history.

(56) References Cited

U.S. PATENT DOCUMENTS

| | | | |
|---|---|---|---|
| 6,012,090 A | 1/2000 | Chung et al. | |
| 6,018,724 A | 1/2000 | Arent | |
| 6,182,139 B1* | 1/2001 | Brendel | 709/226 |
| 6,338,094 B1* | 1/2002 | Scott et al. | 709/245 |
| 6,393,581 B1 | 5/2002 | Friedman et al. | |
| 6,731,625 B1 | 5/2004 | Eastep et al. | |
| 6,742,015 B1 | 5/2004 | Bowman-Amuah | |
| 7,082,454 B1* | 7/2006 | Gheith | 709/203 |
| 2002/0120800 A1* | 8/2002 | Sugahara et al. | 710/260 |
| 2004/0010546 A1* | 1/2004 | Klug et al. | 709/203 |
| 2004/0192383 A1* | 9/2004 | Zacks et al. | 455/557 |

* cited by examiner

*Primary Examiner*—Ario Etienne
*Assistant Examiner*—Avi Gold
(74) *Attorney, Agent, or Firm*—Brinks Hofer Gilson & Lione

(57) ABSTRACT

A system is disclosed for masking errors that may occur during a delay of a client connecting with a server on a network. A connection utility requests a connection with the server. The connection utility determines if a timeout error occurred. If the timeout error occurred, a first browser page presented by the client is displayed to indicate a connection is being made. A browser page presented by the server is displayed when the connection is made.

15 Claims, 3 Drawing Sheets

NETWORK CONNECTION UTILITY

FIELD OF THE INVENTION

The invention generally relates to computer networks, and more particularly to a connection utility for masking a timeout that may occur while a client connects to a server on a computer network.

BACKGROUND

The transfer of information over computer networks has become an increasingly important way by which institutions, corporations, and individuals communicate and conduct business. Computer networks have grown over the years from independent and isolated entities established to serve the needs of a single group into vast networks that interconnect disparate physical networks and allow them to function as a coordinated system. The largest computer network in existence, the Internet, is a worldwide interconnection of computer networks that communicate via web pages using common protocols.

A software application used to locate and display the web pages on the computer network is a browser. Millions of computers, from low-end personal computers to high-end super computers, may be connected to the Internet via the browsers. Sometimes, when trying to connect one computer to another computer on the network, a delay occurs in establishing the connection. The browser may display an error message while the computer continues to send requests to establish a connection. The delay may be normal, but a user may believe a problem exists if the browser error message is displayed to the user during the connection process.

SUMMARY

A system masks errors that may occur during a delay of a client connecting with a server on a network. A connection utility requests a connection with the server. The connection utility determines if a timeout error occurred. If the timeout error occurred, a first browser page presented by a client is displayed to indicate a connection is being made. A browser page presented by a server is displayed when the connection is made.

Other systems, methods, features and advantages of the invention will be, or will become, apparent to one with skill in the art upon examination of the following figures and detailed description. It is intended that all such additional systems, methods, features and advantages be included within the description, be within the scope of the invention, and be protected by the following claims.

BRIEF DESCRIPTION OF THE DRAWINGS

The system can be better understood with reference to the following drawings and description. The components in the figures are not necessarily to scale, emphasis instead being placed upon illustrating the principles of the invention. Moreover, in the figures, like references numerals designate corresponding parts throughout the different views.

DETAILED DESCRIPTION

A system is disclosed that allows a user to connect with a server without having to repeatedly refresh a browser while a network connection is being established. A connection utility may mask timeout error messages as the connection is being established. The connection utility may leverage existing browser technology.

Figure 1:
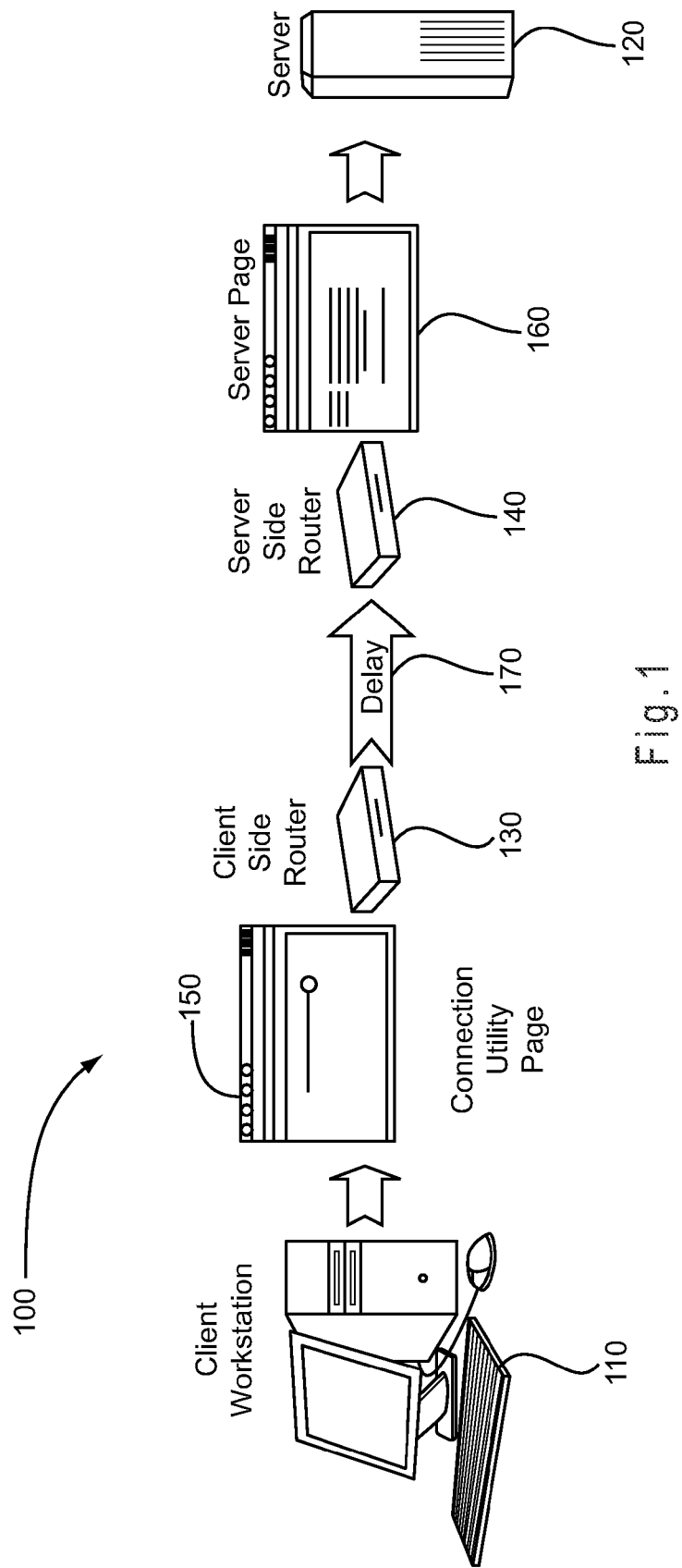
FIG. 1 is a block diagram of at least a portion of an example of a computer network that may use a connection utility.

FIG. 1 is a block diagram of at least a portion of an example of a computer network 100 that may use the connection utility. The computer network 100 includes one or more client workstations 110 from which a user may attempt to connect with one or more servers 120. The client workstation or client 110 may be described as a member of a class or group that uses the services of another class or group. In the context of the computer network 100, the client 110 may include a process, such as a program or task, which requests a service that is provided by another process, known as a server program. The client process may use the requested service without having to know any working details about the other server program or the server 120. The server 120 may include a remote computer system that is accessible over a communications medium such as the Internet. The client process may be active in a second computer system, and communicate with the server process over a communications medium that allows multiple clients 110 to take advantage of the information-gathering capabilities of the server 120 and/or multiple servers. Thus, the server 120 may act as an information provider for the computer network 100.

The client workstation 110 may include user interfaces, such as a display, a keyboard, a mouse, or other interfaces such as a light pen, and a browser. The browser is a program that enables a computer, such as the computer that functions as the client 110, to locate, download, and display documents containing text, sound, video, graphics, animation, and photographs located on the computer network 100. Users may browse through documents on open, public-access networks such as Internets, or on closed networks such as intranets and/or virtual private networks. The browser may download information over communication connections to a user's computer through the user's modem, via wired or wireless connections, such as phone lines, cable lines, satellite, cellular, Bluetooth, etc. The downloaded information may be display on the computer. Documents on the networks are referred to as hypertext if the media is text and/or graphics. The browser interprets a hyper text markup language (HTML) or extensible markup language (XML) code from web page files, executes embedded scripts and programs, provides encryption/decryption for security where needed, and provides links to related pages.

The client 110 and the server 120 connect by one or more routers, such as a client side router 130 and a server side router 140. An exemplary router includes a commercially available modular access router, but other routers may be used. The router may be able to provide, encryption, a virtual private network connection, security firewalls, high-speed wide area network access connectivity over the Internet, and other features such as integration of data, voice, video and fax. The routers are devices that forward data packets along the computer network 100. The routers use headers and forwarding tables to determine the best path for forwarding information packets between the client 110 and the server 120. The routers may use protocols such as Internet Control Message Protocol (ICMP) to communicate with each other and configure the best route between the client 110 and the server 120. The ICMP includes a PING command to test an Internet connection. The PING command is a utility that is used to determine whether a specific Internet protocol (IP) address is accessible. The IP address is an identifier for the computer or device, such as the server 120, of the computer network 100. The PING command works by sending a packet to the specified address and waiting for a reply.

The computer network 100 that is established may include a virtual private network (VPN) or other network. A VPN includes a private network that uses a public network, usually the Internet, to connect remote sites or users together. Instead of using a dedicated, real-world connection such as leased line, a VPN may use virtual connections routed through the Internet from a company's private network to the remote site or user.

Figure 2:
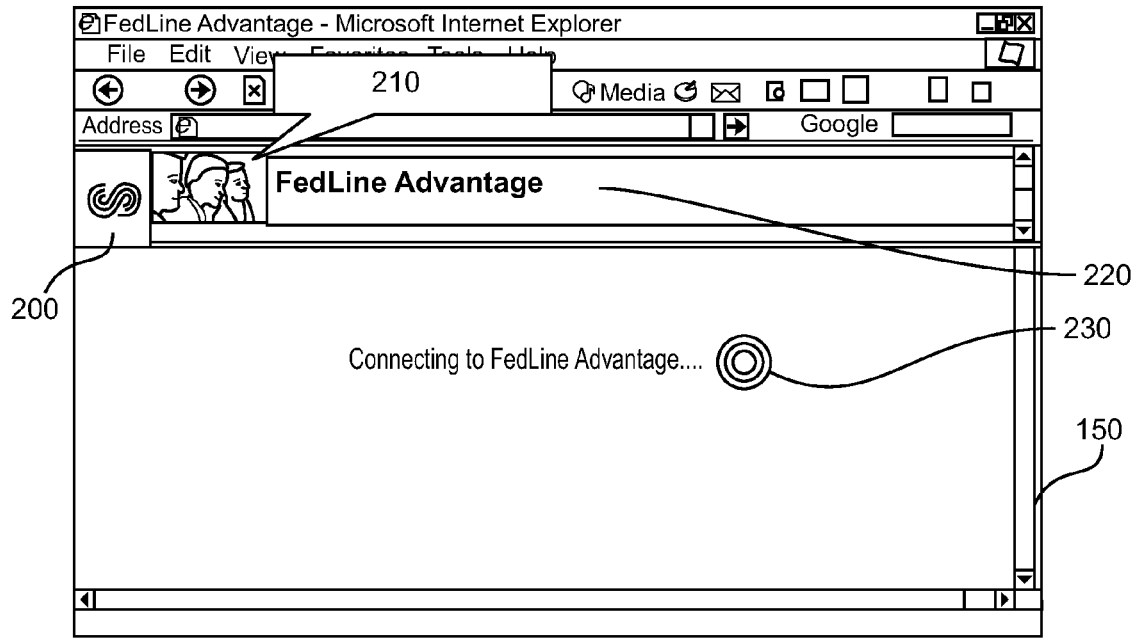
FIG. 2 is a screen shot of an exemplary connection utility page of the connection utility.

FIG. 2 is a screen shot of an exemplary connection utility page 150 (see also FIG. 1) of the connection utility. As the user of the client 110 attempts to connect to the server 120 through the computer network 100, the browser may display a connection utility page 150. The connection utility page 150 may include a logo 200, such as logo of the company running the server 120. The page 150 may also include a branding photo 210 and the name of the program 220 of the server. Multiple branding photos may be stored and displayed in a determined way or at random. To visually indicate that an action is occurring, e.g., a connection is made, the page 150 may also display an icon 230, such as an animated swirl or other icon. The logo 200, the branding photo 210 and the swirl icon 230 may be the only non-HTML elements displayed on the page. These items may be stored as files located in a folder. When the browser loads a page, the files may be selected to be displayed. The other parts of the page layout may be accomplished with text and HTML tables with background colors.

Figure 3:
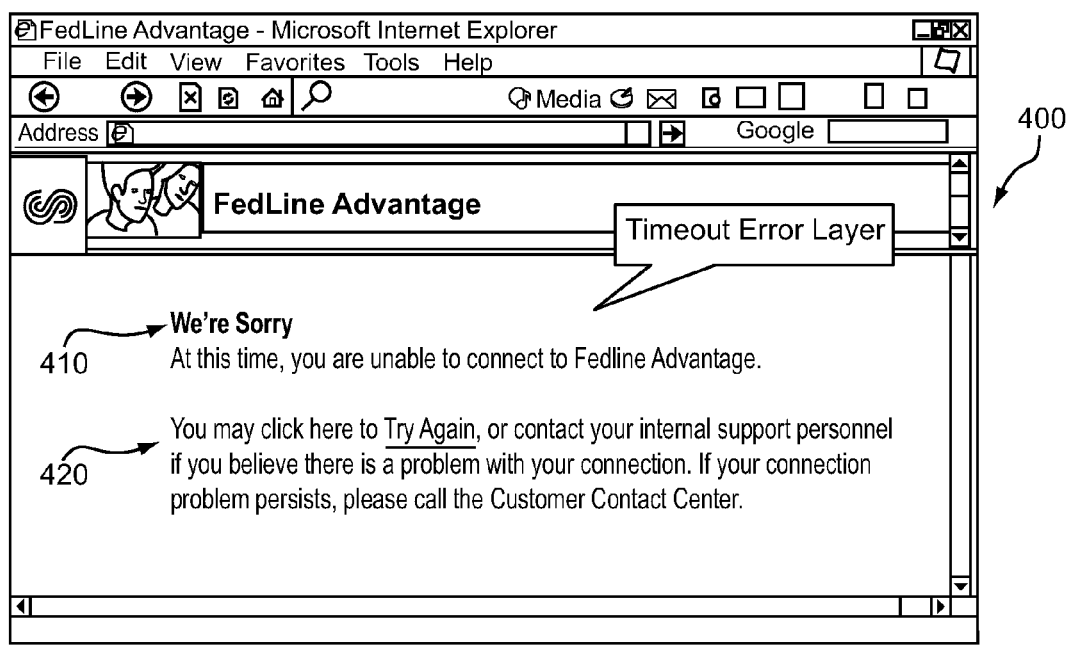
FIG. 3 is a flowchart illustrating an example decision process the connection utility.

FIG. 3 is a flowchart illustrating an example decision process of the connection utility. The connection utility page 150 may be displayed while the network connection 100 is being established. While the connection is being established, a delay 170 (FIG. 1) may occur. Timeouts error that may occur during the delay can be hidden from the user such that only the connection utility page 150 is displayed, and not an error page. Once the connection is established, a server page 160 (FIG. 1) may be displayed to the user.

The connection utility may use a program, such as JAVA-SCRIPT or other scripting language, and a browser's data island, such as MICRSOFT INTERNET EXPLORER XML data islands, to determine if timeout errors are occurring while a network connection is being made. JAVASCRIPT is primarily a scripting language used to modify properties and behaviors of elements in a web page. Error messages on the page may be dynamic HTML (DHTML) layers which are invisible to the user when the page loads. When an error condition is met, JAVASCRIPT may set the visible property of the corresponding layer to "visible". JAVASCRIPT may also be used to check the browser type and version and PING the server page 160 to determine if a connection can be made, as described in more detail below.

The logic of the connection utility may be encoded in a signal bearing medium, a computer readable medium such as a memory, programmed within a device such as one or more integrated circuits, and/or processed by a computer. If the connection utility process is performed by software, the software may reside in a memory resident to or interfaced to the clients, servers, a communication interface, or any other type of non-volatile or volatile memory interfaced or resident to the network logic. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may include any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium includes: an electrical or electronic connection having one or more wires, a portable magnetic or optical disk, a volatile memory such as a Random Access Memory "RAM" (electronic), a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may be stored in a computer and/or machine memory.

At block 300, the connection utility may use the browser to load the connection utility page 150, or other page. The connection utility may present the user with an icon, such as the icon 200, which the user may engage such as by clicking to request the connection to the server 120. The icon may facilitate navigating the connection path by including the IP address of the server 120, so that the user does not have to remember the address. At block 310, the connection utility may determine if the browser is supported, such that the browser is a determined type of browser and exceeds a determined version. For example, the connection utility may require that the client 110 utilize an INTERNET EXPLORER browser of version 5.5 or greater. The type and version of browser required is implementation dependent and other browser types and versions may be used. At block 320, if the criteria for the browser type or version are not met, a browser error message is displayed to the user.

At block 330, the connection utility requests the resource, such as browser server page 160. At block 340, the connection utility determines if an error message is received. The error message may indicate that the resource is not available or the browser timed out. At block 350, if no error message is received, the connection is established and the browser forwards the user to the server page 160. The connection utility may check the XML data island to determine whether or not the server page 160 was available or an error message occurred. The XML data islands are a mechanism built into INTERNET EXPLORER for handling the loading and manipulation of XML data. The XML data islands may serve as a holding pen for XML data so that extensible style language (XSL) transforms, or other style specification transforms such as of Cascading Style Sheets (CSS), may be performed and the results displayed on the page.

The XML data island may be used as the destination for the resource request. The JAVASCRIPT PING code attempts to load a resource into the XML data island. The data island includes a specific error code for "resource not available", which indicates that a timeout error may occur. Other error codes indicate that a resource has been located, but there are problems with the resource as a well-formatted XML document. Error codes, other than "resource not available", may be displayed to the user to indicate that the server page 160 is not currently accessible, as described in more detail with regard to FIG. 4 below.

If a "resource not available", or other message that indicates that a timeout error may occur, was received, at block 360, the connection utility determines if the minimum number of retries to connect with the resource has been exceeded. If the minimum number of retries has not been exceeded, at block 330 the connection utility attempts to connect with the server 120 again. If the minimum number of retries has been exceeded, at block 370, the connection utility determines if the minimum time limit has been exceeded. An exemplary minimum time limit is about two minutes. If the minimum time limit has not been exceeded, at block 330 the connection utility attempts to connect with the server 120 again. At block 380, if the minimum time limit has been exceeded, a timeout error is displayed to the user.

Figure 4:
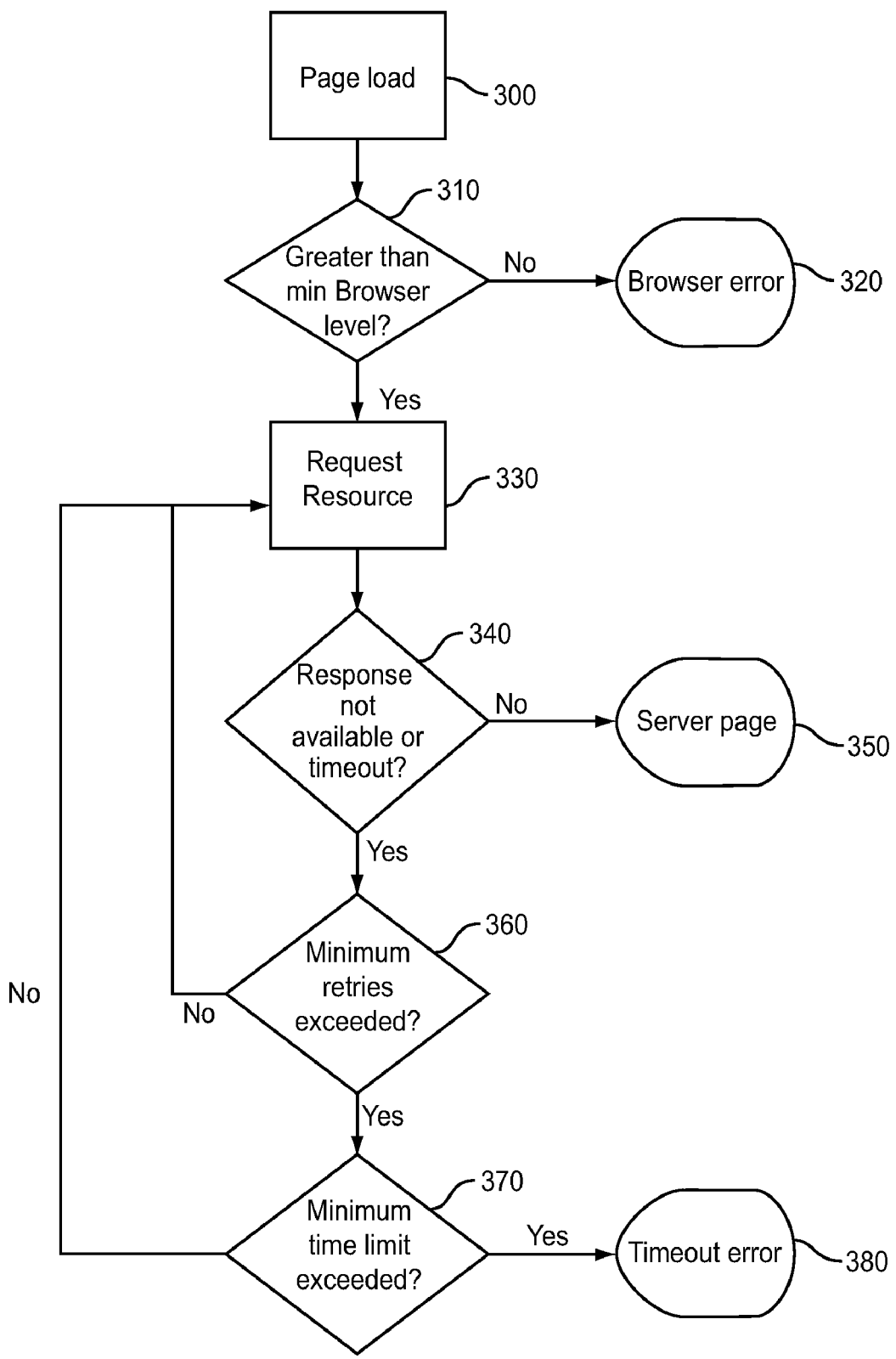
FIG. 4 is a screen shot of an example notification to the user that an error has occurred.

FIG. 4 is a screen shot 400 of an example notification to the user that an error has occurred. The page being displayed to the user may be redrawn by making the timeout error layer visible. An error message 410 may be displayed, such as, "at this time, you are unable to connect" to the application. Another message may also be displayed which provides the user with a link to "try again". The error message may be written in HTML which is downloaded with the page so that no additional server traffic is required. The user may be notified that if the problem connecting persists, the user can contact a customer service center.

As a particular example, the XML data island may be implemented in the body of an HTML document as follows:

<xml id="theDoc" onreadystatechange="checkLoc( )"></xml>

The id may specify a tag, such as Div Tag, as being named "theDoc" such that the JAVASCRIPT may reference the tag through a document object model (DOM). A tag is a command inserted in a document that specifies how the document, or a portion of the document, is formatted. Tags may be used by all format specifications that store documents as text files. For example, the tag may contain error text to be displayed if an error condition is detected. The JAVASCRIPT on the page attempts to load a resource into the data island by specifying the source (theDoc.src="URL").

The onreadystatechange may be an event handler for the data island. The event occurs whenever the data island either times out or receives data after having the source set. When the event occurs, a checkLoc function of the JAVASCRIPT on the page is called which checks for errors thrown by the data island and decides whether to forward the user to the server page or display an error. The "resource not available" message has an error number of 2146697211. Other responses from the data island indicate that the resource has been detected and the user may be forwarded to the server page.

Div Tags that may be implemented in the code include an error layer, such as the following:

<div id="errorPane" style="position:absolute; width: 510px; height:203px; z-index:1; left: 172px; top: 123px; visibility: hidden;">
<table width="600" border="0" cellspacing="0" cellpadding="0"><tr>
<td height="300" valign="top" bgcolor="#FFFFFF">
<span class="header-topic">We're sorry.
</span><br>
<span class="header-page">At this time, you are unable to connect to Fedline Advantage.
</span><br><br>
You may click here to <a href=javascript:window.location.reload( )>Try Again</a>, or contact your internal support personnel <br>
if you believe there is a problem with your connection. If your connection<br>
problem persists, please call the Customer Contact Center. </td></tr></table></div>

The id provides the JAVASCRIPT with the ability to reference the object through the DOM. For INTERNET EXPLORER, the reference is document.all["errorPane"], for NETSCAPE 4.X the reference is document.layersr["errorPane"], and for OPERA, NETSCAPE 7 and other Mozilla based browsers, the reference is document.getElementByld ("errorPage"). The inner HTML of the Div Tag can be edited and laid out as normal HTML. The tag also may have a style property which determines the appearance of the layer. The elements within the property determine the width, height, position, and visibility of the tag. The visibility of the error pages are hidden upon load. If an error is detected, the JAVASCRIPT sets the visibility of the layer to "visible" to display the error to the user.

The JAVASCRIPT code may be contained in three script tags, such as two in the head, at the top of the document, and one at the end of the body. The first of the two top scripts may contain the connection utility engine. The top script includes a section to initialize variables and four functions, such as:

testBrowser( )

Checks the version of the browser and sends a browser error if the minimum browser requirements are not met.

testConnect( )

Initializes the resource request by setting the src of the XML data island.

checkLoc( )

Processes the response from the data island and performs an action depending on the response.

changeLocation( )

Forwards the user to the specified destination uniform resource locator (URL), the global address of documents and other resources on the World Wide Web.

Initialization of the variable may include:
//initialization variable
// this is the number of seconds between attempts
var connectDelay=3;
// this is the number of retries after the number of seconds defined above
// after this many retries, connection is deemed a failure var maxConnectAttempts=4;
// the url to which the browser is redirected if a connection is detected
var destinationURL="https://<destination IP address>"
// the url to 'ping' to determine if there is an active connection
// may be the same as the destination URL
var test URL=https://<destination IP address>
// local variables, may not change
var connectAttempsMade=1;
var errorThrown=false;
var startTime=Date.parse(new Date( );
var minimumTime=40.

With respect to the particular examples of the different variable, connectDelay determines the amount of time between the completion of a resource request cycle and the beginning of a new cycle. In this example, 3 seconds pass between the end of the last attempt to locate a resource and the next attempt. The maxConnectAttempts variable determines the number of attempts the application will make before determining that no connection can be established. In practice, a VPN will not respond to a request if no connection established. The browser timeout mechanism may be relied upon to end a request. The browser times out after 20 seconds. Therefore, 4 attempts will take 20 seconds with a 3 second delay between each attempt for a total of 92 seconds before the application times out. The number of attempts and delay time is implementation dependent, and other times may be used.

With respect to other variables, the testURL specifies the location of the resource to be loaded in to the XML data island. The destinationURL specifies the location to which the user is forwarded if a connection is established. The connectAttemptsMade is a counter that is used to keep track of the number of resource requests made. The connection utility compares the number of attempts made to the maxConnectAttempts variable to determine if the connection utility should retry the connection or if a connection error message should be displayed. The errorThrown variable is set to true if either the browser or a timeout error is reported. If errorThrown is set to true, the connection utility application may stop further resource requests. The startTime variable grabs the current date, such as in milliseconds, at the time the page loads. MinimumTime specifies, such as in seconds, the minimum amount of time the application should continue to try to establish a connection. It the maximum number of attempts has passed but the minimum amount of time has not, the application may continue to make resource requests.

The second of the two top scripts may contain a function MM_reloadPage. The function may be designed to handle a resizing error exhibited by NETSCAPE 4. The script may refresh the content of the page if a NETSCAPE 4.X user resized the page.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

We claim:

1. A method of masking errors that may occur during a delay of a client connecting with a server on a network, comprising:
   requesting a connection with the server;
   determining if an error occurred;
   if the error occurred, again requesting a connection with the server while displaying a first browser page presented by the client that indicates a connection is being made, but not indicating that the error occurred, displaying a browser page presented by the server when the connection is made; and
   determining if an error other than a timeout error occurred, displaying a second browser page presented by the client that indicates an error occurred if an error other than the timeout error occurred, and canceling the request to make the connection, wherein the second browser page presented by the client indicates that a minimum browser level was not met.

2. The method of claim 1 wherein the error comprises a timeout error.

3. The method of claim 2 further comprising keeping track of a number of timeout errors that occurred.

4. The method of claim 3 further comprising displaying an error message if the number of timeout errors exceeds a determined number.

5. The method of claim 3 further comprising determining an amount of time that has elapsed since requesting the connection.

6. The method of claim 5 further comprising displaying an error message if the number of timeout errors exceeds a determined number and a determined amount of time has elapsed.

7. The method of claim 1 further comprising:
   checking an extensible markup language data island to determine if the error occurred.

8. A system for masking errors that may occur during a delay of a client connecting with a server on a network, the system comprising:
   a logic storable on a memory medium, wherein the logic includes a connection utility;
   wherein the connection utility requests a connection with the server and determines if an error occurred; and
   wherein, if the error occurred, the connection utility again requests a connection with the server while a browser page presented by the client is displayed that indicates a connection is being made, but not indicating that the error occurred, and displaying a browser page presented by the server when the connection is made; and
   wherein the logic determines if a minimum browser level is met, and if the minimum browser level is not met, the logic sends a signal to display a second browser page presented by the client that indicates that the minimum browser level was not met and the attempt to connect with the server is ceased.

9. The system of claim 8, wherein the memory medium is accessible by a processor of the client.

10. The system of claim 8 wherein the error comprises a timeout error.

11. The system of claim 10 wherein the logic keeps track of a number of timeout errors that occurred.

12. The system of claim 11 wherein the logic sends a signal to display an error message if the number of timeout errors exceeds a determined number.

13. The system of claim 11 wherein the logic determines an amount of time that has elapsed since requesting the connection.

14. The system of claim 13 wherein the logic sends a signal to display an error message if the number of timeout errors exceeds a determined number and a determined amount of time has elapsed.

15. The system of claim 8 wherein the logic checks an extensible markup language data island to determine if the error occurred.

* * * * *